US00RE41610E

(19) United States
(12) Reissued Patent
Eiselt et al.

(10) Patent Number: US RE41,610 E
(45) Date of Reissued Patent: Aug. 31, 2010

(54) GAIN EQUALIZATION SYSTEM AND METHOD

(76) Inventors: Michael H. Eiselt, An der Gebind 7, 99334 Kirchheim (DE); Mark Shtaif, 3A Maale Haretamim St., P.O. Box 3048, Even Yehuda (IL), 40500

(21) Appl. No.: 11/150,606

(22) Filed: Jun. 10, 2005

Related U.S. Patent Documents

Reissue of:
(64) Patent No.: 6,577,788
Issued: Jun. 10, 2003
Appl. No.: 10/023,579
Filed: Dec. 14, 2001

(51) Int. Cl.
*G02B 6/28* (2006.01)
*H04J 14/02* (2006.01)

(52) U.S. Cl. ..... 385/24; 359/124; 359/127
(58) Field of Classification Search ..... None
See application file for complete search history.

(56) References Cited

U.S. PATENT DOCUMENTS

| | | | | |
|---|---|---|---|---|
| 5,926,590 | A | 7/1999 | Mao | 385/24 |
| 6,307,691 | B1 | 10/2001 | Goossen | 359/885 |
| 6,337,753 | B1 * | 1/2002 | Goossen | 398/79 |
| 6,411,417 | B1 | 6/2002 | Roberts et al. | 359/161 |
| 7,023,611 | B2 * | 4/2006 | Huang et al. | 359/337 |
| 2002/0003647 | A1 * | 1/2002 | Tsuritani et al. | 359/173 |
| 2002/0060838 | A1 | 5/2002 | Brindel et al. | 359/337 |
| 2003/0039006 | A1 * | 2/2003 | Carbone et al. | 359/124 |

* cited by examiner

*Primary Examiner*—Tina M Wong
(74) *Attorney, Agent, or Firm*—Woodcock Washburn LLP

(57) ABSTRACT

A power equalization system and method for use in an optical transmission system are provided. The power equalization system includes an optical line including at least one transmission channel and a management line. The transmission system further includes a plurality of amplifiers, a plurality of Optical spectrum analyzers and a plurality of equalizers. The plurality of amplifiers are coupled to the optical line, spaced periodically throughout the optical transmission system. As information is sent through the optical transmission system, the plurality of amplifiers boost the power of each channel of the optical signal. A plurality of optical spectrum analyzers are also coupled to the optical lien and are spaced periodically throughout the optical transmission system and are co-located with a first portion of the amplifiers coupled to the optical line. A plurality of equalizers are also coupled to the optical line and are spaced periodically throughout the optical transmission system and equalize the power on each channel of the optical line. The plurality of equalizers are co-located with a second portion of the plurality of amplifiers and at least one of the plurality of Optical spectrum analyzers is not co-located with one of the plurality of equalizers. As optical information is transmitted over the optical transmission system, the Optical spectrum analyzers provide analysis data via the management line to the non co-located equalizers for use by the equalizers in equalizing the power of the channels of the optical line at that point. The analysis data generated by the Optical spectrum analyzer identifies the analysis data at the point of the Optical spectrum analyzer which is not co-located with the equalizer.

50 Claims, 3 Drawing Sheets

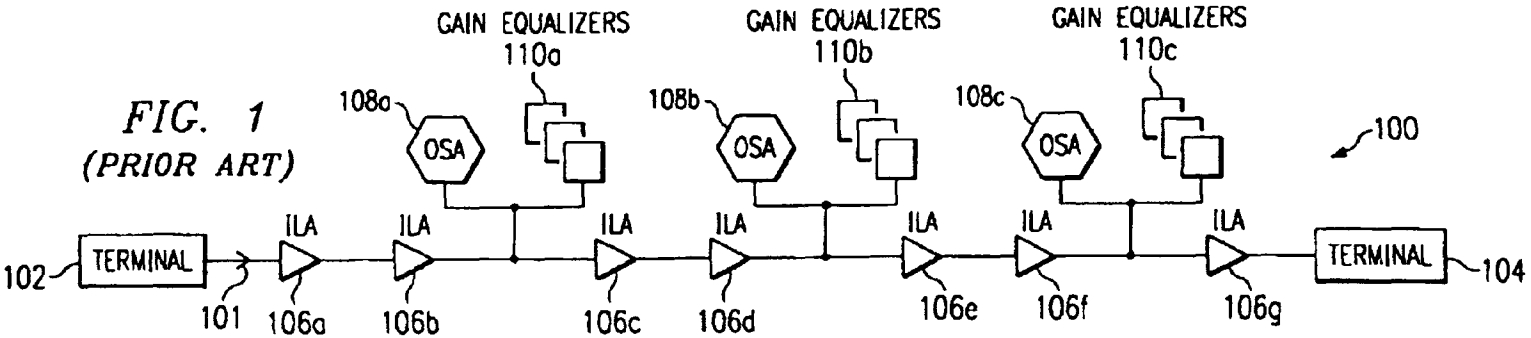
FIG. 1
(PRIOR ART)
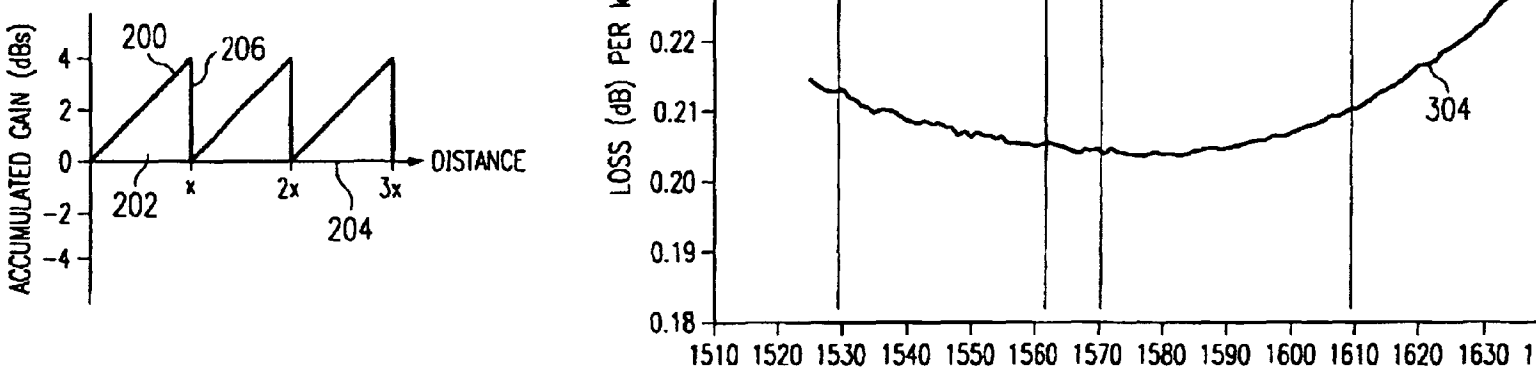
FIG. 2
(PRIOR ART)
FIG. 3

GAIN EQUALIZATION SYSTEM AND METHOD

Matter enclosed in heavy brackets [ ] appears in the original patent but forms no part of this reissue specification; matter printed in italics indicates the additions made by reissue.

CROSS--REFERENCE TO RELATED APPLICATIONS

Not Applicable.

STATEMENT REGARDING FEDERALLY SPONSORED RESEARCH/DEVELOPMENT

Not Applicable.

FIELD OF THE INVENTION

This invention relates to an equalization system, and more particularly, to a system for use in an optical network to correct for unequal gain of power in the channels of the optical signal.

BACKGROUND OF THE INVENTION

The transmission, routing and dissemination of information has occurred over computer networks for many years via standard electronic communication lines. These communication lines are effective, but place limits on the amount of information being transmitted and the speed of the transmission. With the advent of light-wave technology, a large amount of information is capable of being transmitted, routed and disseminated across great distances at a high transmission rate over fiber optic communication lines.

When information is transmitted over fiber optic communication lines, impairments of the pulse of light carrying the information can occur, including pulse broadening (dispersion) and attenuation (energy loss). In-line amplifiers spaced throughout the fiber optic communication system boosts the power of each channel of the optical signal to assist in the compensation of the energy lost during transmission. The in-line amplifiers boost each channel of the optical signal with the same amount of power. However, as different wave lengths of light are used over the different channels of the fiber optic communication system, the amount of energy lost per channel is not consistent. As the in-line amplifier boosts the energy across all channels of the optical signal transmitted over the fiber optic communication system, the power gain of any specific channel may fail to meet or exceed the desired power gain. Further, energy loss caused by polarization dependent loss (PDL) lead to further nonuniform power gain over the multiple channels of the optical signal transmitted over the fiber optic communication system.

As the optical signal is transmitted across the fiber optic communication system, the gain differences on a channel-by-channel basis accumulate. These gain differences can cause distortions of the optical signal shape and therefore lead to performance degradation. Current systems allow for the optical signals' power deviations to accumulate before they are compensated by the gain equalizer after analysis by the optical spectrum analyzer ("OSA"). Inherent in these systems is a process which allows a large amount of gain differences to accumulate prior to equalization. Prior to the gain equalization of the channels of the optical signal, the optical signal performance beings to degrade and thus the overall performance of the fiber optic communications system is degraded.

To compensate for gain differences in the multiple channels of the optical signal, gain equalizers are provided, spaced periodically, throughout the fiber optic communication lines (FIG. 1). the gain equalizers equalize the power at the in-line amplifiers on a channel-by-channel basis throughout the optical signal. To determine the amount of gain on a channel-b-channel basis, an optical spectrum analyzer is co-located with the gain equalizer. The Optical measures the power level associated with each channel of the optical signal and compares this power level with the desired power level for each channel and provides this information to the gain equalizer which is co-located with the Optical spectrum analyzer at an in-line amplifier within the fiber optic communication system. The gain equalizer then equalizes the power of each channel based upon the analysis performed by the Optical spectrum analyzer at this in-line amplifier location. As can be seen in FIG. 2, the gain equalizer zeroes out the gain difference throughout the channels at the point in the fiber optic communication system where the gain equalizer and Optical spectrum analyzer are located. Therefore, any advancement in the ability to lower the amount of gain difference accumulated during the transmission of information over a fiber optic communication system would be advantageous.

SUMMARY OF THE INVENTION

A power equalization system and method for use in an optical transmission system are provided. The power equalization system includes an optical line including at least one transmission channel and a management line. The transmission system further includes a plurality of amplifiers, a plurality of Optical spectrum analyzers and a plurality of equalizers. The plurality of amplifiers are coupled to the optical line, spaced periodically throughout the optical transmission system. As information is sent through the optical transmission system, the plurality of amplifiers boost the power of each channel of the optical signal. A plurality of Optical spectrum analyzers are also coupled to the optical lien and are spaced periodically throughout the optical transmission system and are co-located with a first portion of the amplifiers coupled to the optical line. A plurality of equalizers are also coupled to the optical line and are spaced periodically throughout the optical transmission system and equalize the power on each channel of the optical line. The plurality of equalizers are co-located with a second portion of the plurality of amplifiers and at least one of the plurality of Optical spectrum analyzers is not co-located with one of the plurality of equalizers. Thus, as the optical information is transmitted over the optical transmission system, the Optical spectrum analyzers provide analysis data via the management line to the non co-located equalizers for use by the equalizers in equalizing the power of the channels of the optical line at that point. The analysis data generated by the Optical spectrum analyzer identifies the analysis data at the point of the Optical spectrum analyzer which is not co-located with the equalizer.

DETAILED DESCRIPTION OF THE DRAWINGS

A better understanding of the invention can be obtained from the following detailed description of one exemplary embodiments as considered in conjunction with the following drawings in which:

FIG. 1 is a block diagram depicting an optical transmission system according to the prior art;

FIG. 2 is a graphical representation of the accumulated gain of an optical signal being transmitted over an optical transmission system according to the prior art;

FIG. 3 is a graphical representation of the loss per kilometer of different wavelengths of an optical signal transmitted through an optical transmission system;

Figure 6:
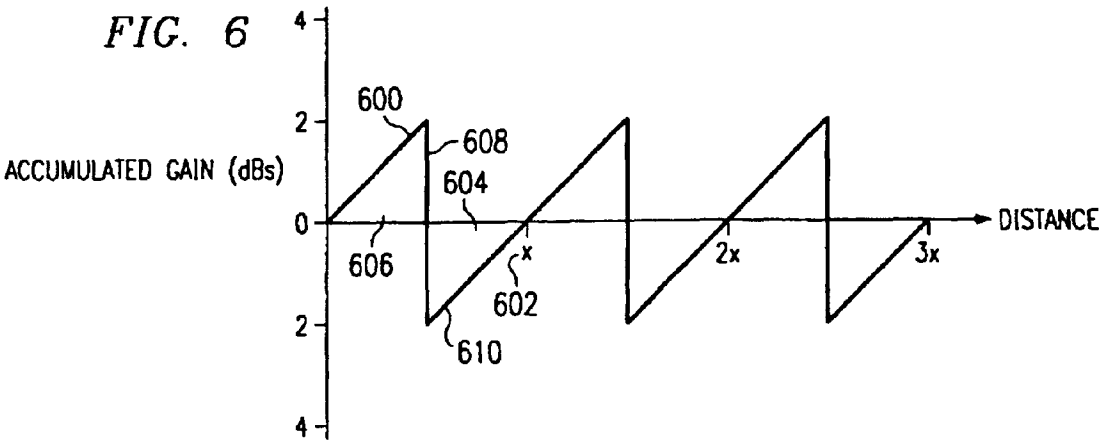
Figure 7:
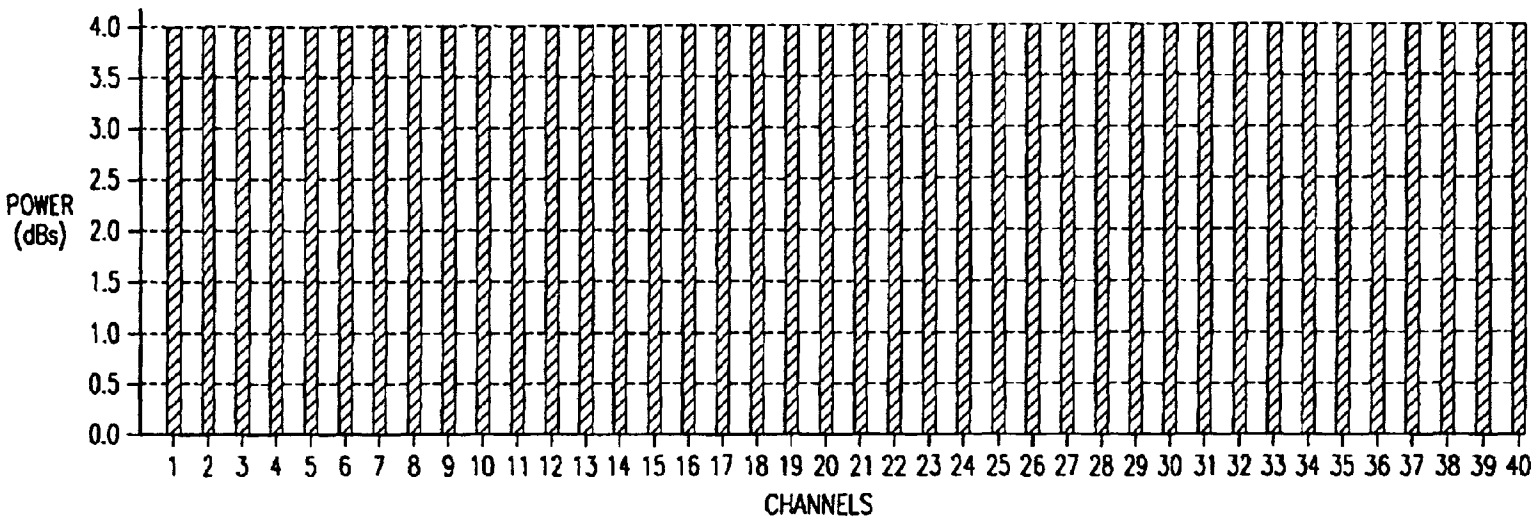

FIG. 6 is a graphical representation of the accumulated gain per channel of an optical signal transmission across the optical transmission system according to the present invention; and FIG. 7 is a graphical representation of the accumulated gain per channel of the optical signal after the gain equalization has occurred according to the optical transmission system according to the present invention.

DETAILED DESCRIPTION OF EXEMPLARY EMBODIMENTS

In the descriptions which follows, like parts are marked throughout the specification and drawings with the same numerals, respectively. The drawing figures are not necessarily drawn to scale and certain figures may be shown in exaggerated or generalized form in the interest of clarity and conciseness.

In an optical transmission sytem, the optical signal is transmitted over an optical line. In certain optical transmission systems, including dense wavelength division multiplexed systems (DWDM systems), the optical signal that is transmitted includes multiple channels where each channel of the optical signal is transmitted at a different wavelength. As originally transmitted, the optical signal does not contain enough energy to complete a long haul or ultra long haul transmission therefore, the optical signal must be amplified periodically throughout the optical line. The amplifiers are used to replace energy loss due to attenuation with an equal amount of replacement energy per wavelength (or per channel) in the optical signal. There are multiple wavelengths or channels in each optical signal transmitted over the optical transmission system. In one disclosed embodiment, forty wavelengths are capable of being transmitted through one optical signal. As the amount of power attenuation varies among the channels of the optical signal, some channels experience an excessive amount of gain caused by the amplifier, some experience the correct amount of gain and some experience too little gain. These gain differences experienced by different channels of the optical signal are accumulated and are caused by the wavelength profile of the amplifiers or by effects such as polarization dependent loss (PDL) in the various components located in the optical system. The losses per wavelength are not perfectly flat. The number of energy lost between any two points along the optical network will typically remain nearly constant if the lost power is caused by the amplification of the amplifiers. A random gain deviation can be experienced intermittently and is typically not consistent.

In a conventional optical networks 100, as can be seen in FIG. 1, gain deviation is corrected through the use of optical spectrum analyzers 108 and dynamic gain equalizers 110. The conventional optical network 100 includes terminals 102 and 104. The terminals 102 and 104 connect the remaining conventional optical network 100, which is typically a dense wavelength division multiplexed (DWDM) network to the local optical network (not shown). The terminal 102 receives an optical signal from the local optical network and transmits this optical signal across the conventional optical network 100 to terminal 104. For the sake of illustration, the conventional optical network 100 is shown operating in only one direction; however, it is well known to those skilled in the art that an optical network can function bi-directionally.

The optical signal 101 is typically comprised of twenty to forty channels. Each channel of the optical signal 101 is a separate wavelength of the optical signal. The optical signal 101 is typically transmitted in wavelengths between 1530 and 1610 nm. As the optical signal 101 is transmitted from the terminal 102 over the optical network 100, the optical signal 101 begins to experience attenuation or power loss. therefore, an in-line amplifier 106 is provided at fixed intervals to boost the power of the optical signal 101.

The in-line amplifier 106 boosts the power of the optical signal 101 according to a predetermined value or according to a value that can be adjusted during operation. The In-line amplifier 106 boosts the power of the optical signal 101 across every channel, applying the same power boost to every channel regardless of the channels current power level. Therefore, as gain differences are experienced in the multiple channels of the optical signal 101, these gain differences are accumulated through the amplification of the optical signal 101 from the In-line amplifiers 106. As the optical signal 101 is transmitted from In-line amplifier 106a to In-line amplifier 106b, the optical signal 101 experiences attenuation and again must be amplified.

However, prior to amplification at In-line amplifier 106b, an optical spectrum analyzer 108a evaluates each channel of the optical signal 101 to determine its current power deviation from the expected value. The optical signal analyzer 108a then transmits this power or gain deviation information to a dynamic gain equalizer 110a which then adjusts the optical signal 101 on a channel-by-channel basis to optimize the power in each channel. Thus, any differences in gain accumulated through the transmission of the optical signal 101 because of random gain or through amplification by the In-line amplifiers 106 are corrected based upon the evaluation of the Optical spectrum analyzer 108a and implemented by the Dynamic gain equalizer 110a.

The process repeats as the optical signal 101 is transmitted through In-line ampolfiers 106c, 106d, 106e, 106f and 106g. The optical signal 101 is analyzed by the optical spectrum analyzers 108b and 108c once the signal reaches In-line amplifiers 106d. The optical spectrum analyzer 108b and 108c identify any gain differences on a channel-by-channel basis of the optical signal 101 before transmitting these gain differences to the dynamic gain equalizers 110b and 110c. The dynamic gain equalizers 110b and 110c then correct for gain differences accumulated, regardless if the gain differences are caused by the In-line amplifiers 106 or through polarization dependent loss.

The number of In-line amplifiers 106 is determined based upon the distance the conventional optical network 100 must cover. Thus, whether the conventional optical network 100 is a long haul or ultra long haul optical network, the frequency in quantity of In-line amplifiers 106 must be determined. Further, the fiber characteristics, the characteristics of the amplifiers, and characteristics of the power necessary for the optical signal 101 determine the quantity of amplifiers 106 needed throughout the conventional optical network 100 and also determine the quantity of analyzers 108 and equalizers 110 necessary in the conventional optical network 100. Therefore, the optical spectrum analyzer 108 and the dynamic gain equalizers 110 may only repeat every nth In-line amplifier 106 where n will be determined based upon the characteristics described above. In the example shown in FIG. 1, the Optical spectrum analyzers 108 and the dynamic gain equalizers 110 are provided at every two In-line amplifiers 106. However, the frequency could be increased or decreased based upon need of the system.

One constant of the conventional optical network 100 is that the Optical spectrum analyzer 108 and the dynamic gain equalizer 110 are co-located at the same in-line amplifier 106. Therefore, the analysis and equalization of the optical signal 101 occurs at one specific point in the optical network and is typically located at an in-line amplifier 106 site.

Turning to FIG. 2, a graph, according to the prior art, of the accumulated gain of an exemplary channel of the optical signal versus a distance is shown. The graph of FIG. 2 illustrates an exemplary channel of the optical signal 101; graphs of other channels of the optical signal 101 may form different slopes, however, the graph of accumulated gain versus distance of all channels of the optical signal 101 will have a common element of reducing the accumulated gain to zero at a specific distance. The graph of FIG. 2 demonstrates that at every distance x, the accumulated gain of an exemplary channel of the optical signal 101 is reduced to zero. Therefore, referring to the embodiment shown in FIG. 1, the distance x would represent the distance between three in-line amplifiers, for example In-line amplifiers 106b–106d. As can be seen from the graph of FIG. 2, the gain of one channel of the optical signal 101 is linear over distance. Therefore, as is seen in FIG. 2, the gain of the exemplary channel of the optical signal 101 increases two decibels through every span where the span equals the distance between two adjacent in-line amplifiers 106. The linear line 200 represents the total gain of the exemplary channel of the optical signal 101 between equalization points, which is represented as distance x. Thus, the gain of the channel equals four decibels over this span. The distance x 204 is the distance between two in-line amplifiers 106, for example, the distance between In-line amplifier 106b and In-line amplifier 106d.

As the gain increases on any channel of the optical signal 101, the integrity of the signal is reduced. Therefore, the greater the area defined by the triangle formed by lines 200, 204 and 206 the greater than accumulated gain 202 and the greater the distortion of the optical signal 101. The graph of FIG. 2 is exemplary of the accumulated gain caused by the effect of the In-line amplifiers 106 providing a constant power boost across the multiple channels of the optical signal 101, and for illustrative purposes does not represent any gain caused by polarization dependent loss or any other random gain accumulation. However, one skilled in the art would recognize that the graphical representation of the accumulated gain versus the distance may be shown with varying accumulated gain over specific distances or may be shown with a non-linear curve representing the accumulated gain over a specific distance.

Referring now to FIG. 3, a graphical representation of the amount of loss attributed to wavelengths commonly implemented in optical transmission systems decibels (dBs) is shown. A curve 304 is shown in FIG. 3 representing the loss in dBs per kilometer versus the specific wavelengths of the channels of the optical signal transmitted over an optical network. The curve 304 is non-linear and represents the varying amount of loss experienced by specific channels of an optical signal as it is transmitted over the optical network. Thus, in the C-band range 300, the amount of loss decreases generally as the wavelength is increased from 1530 to 1560 nms. However, as the wavelength increases from 1570 to 1610 nms to the L-band range 302, the loss begins to generally increase. Therefore when a constant power boost is applied by an In-line amplifier to all channels of the optical signal, where each channel is comprised of a different wavelength, the amount of gain per channel is not uniform and gain differences are propagated through the optical network.

Figure 4:
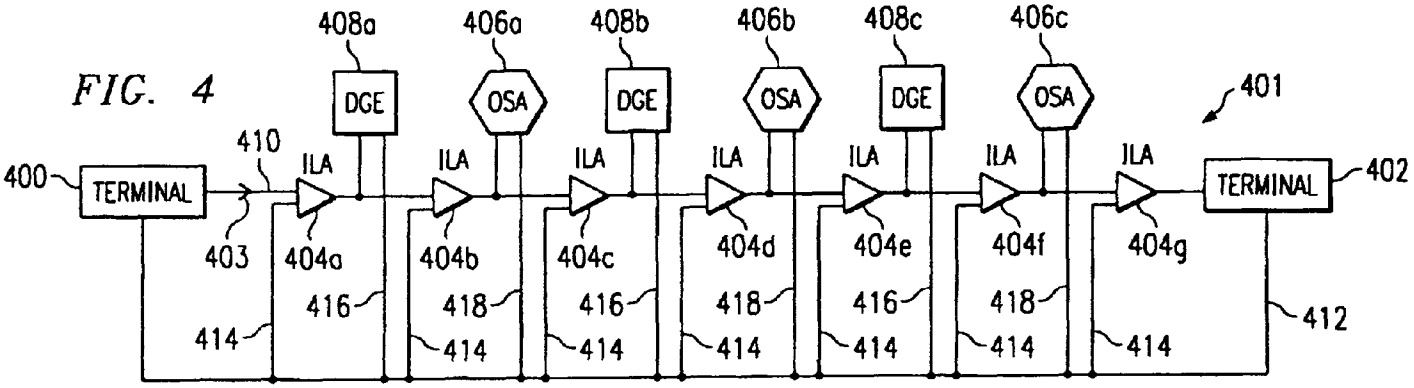
FIG. 4 is a block diagram depicting the optical transmission system according to the present invention.

Referring now to FIG. 4, an exemplary embodiment of an optical network according to the present invention is shown. Terminals 400 and 402 are provided and connect the optical network 401 to local optical networks (not shown). An optical signal 403 is transmitted from the terminal 400 along an optical line 410. For illustrative purposes only, the optical network 401 is shown in a unidirectional manner. However, both of terminals 400 and 402 can act as transmission and/or receiving terminals and it is expected that the optical network 401 can be implemented as a bi-directional optical network allowing the transmission of optical signals from either terminal 400 or terminal 402.

After a predetermined distance, an in-line amplifier 404 is connected to the optical line 410. The repeating predetermined distance of the in-line amplifier 404 is determined as discussed previously. In one embodiment of the invention, erbium-doped fiber amplifiers are implemented as the in-line amplifiers 404, however, a wide range of amplifiers can be implemented without detracting from the spirit of the invention. Once the optical signal 403 travels across this predetermined distance, the In-line amplifier 404a boosts the power of each channel of the optical signal 403. In one embodiment, at start up of the optical network 401, the in-line amplifier 404 do not initially boost the optical signal 403 as the optical signal 403 is transmitted along the optical network 401 as no prior analysis of the optical signal 403 has been completed. An optical spectrum analysis 406 located within the optical system 401 analyzes the optical signal 403 to determine the amount of energy loss experienced by the optical signal 403 through transmission over the optical network 401. The optical spectrum analyzer 406 then transmits this analysis data to the in-line amplifiers 440 and commands the in-line amplifiers 404 to boost the channels of the optical signal 403 by an amount necessary to maintain a constant power level of the optical signal 403 across the optical network 401. This fine turning of the optical network 401 occurs when the optical network is initially initiated, however, the optical spectrum analyzer 406 continuously monitors the strength of the optical signal 403 and can periodically direct a modification to the amounts of power boosted by a specific In-line amplifier 404 during continuous use of the optical network 401 to correct this gain tilt. In another exemplary embodiment the in-line amplifiers' 404 output power is monitored by each in-line amplifier. This self-monitoring allows for the average power out of each in-line amplifier 404 to remain approximately constant. As an additional step to the self-monitoring, a measurement at the Optical spectrum analyzer 406 determines the need for fine turning of the in-line amplifiers 404 output power/average gain of the in-line amplifier 404.

When the optical signal 403 has its power boosted by the In-line amplifier 404a, each channel of the optical signal 403 has the power boosted with a consistent amount from the In-line amplifier 404a. In one disclosed embodiment there are forty channels present in the optical signal 403. All forty channels of the optical signal 403 are boosted by the same power level from the In-line amplifier 404a. As was disclosed with FIG. 3, the power loss per channel varies according to the wavelength of that particular channel. Therefore, the per channel loss varies and the gain difference is amplified and propagated by the In-line amplifier 404a as it is transmitted from In-line amplifier 404a to In-line amplifier 404b. Once the optical signal is received by the In-line amplifier 404b, the optical signal 403 is again boosted on a channel-by-channel basis by the In-line amplifier 404b. However, prior to the optical signal 403 being transmitted to the In-line amplifier 404c, the Optical spectrum analyzer 406a analyzes the optical signal 403 on a channel-by-channel basis to determine the accumulated gain difference from the expected or optimal power level for each channel.

The optical spectrum analyzer 406 also determines the power boost to correct gain tilt propagated by the In-line amplifiers 404 by averaging the power level of all channels and then applying a boost so that the average level of all channels equal the pre-determined power level of the optical signal 403 and further determines the accumulated gain or loss on a channel-by-channel basis of the power level as compared to the pre-determined optimal power level. The optical spectrum analyzer 406 transmits the power boost data to the in-line amplifiers 404 over line 414 via an optical supervising channel 412. Once the Optical spectrum analyzer 406a determines the amount of gain differential for each channel of the optical signal 403, the optical signal analyzer 406a transmits these gain differentials to the dynamic gain equalizer 408 over line 418 via an optical supervising channel 412. The optical supervising channel 412 is a management channel and supervisory information is transmitted via this ethernet channel at 100 megabits to 1 gigabit. The rates of transmission of information over the optical supervising channel 412 may vary without detracting from the spirit and scope of the invention. In another embodiment, the management or supervisory channel can be implemented as a public telephone network or Internet line without detracting from the spirit of the invention. The transmission of management or supervisory information over the management or supervisory channel does not require the use of fiber and is not necessarily one of the wavelength channels of the optical line 410. In one disclosed embodiment, the management and supervisory channel are implemented as the optical supervising channel 412 which transmits management supervisory information optically to the devices connected within the optical network 401. The Optical spectrum analyzer 406a transmits the gain differential of each channel of the optical signal 403 to the dynamic gain equalizer 408a which is co-located with in-line amplifier 404a. The dynamic gain equalizer 408a receives the gain differentials transmitted by the Optical spectrum analyzer 406a through the optical supervising channel 412 over communication line 416. The dynamic gain equalizer 408a and the Optical spectrum analyzer 406a are not co-located with the same in-line amplifier 404. The dynamic gain equalizer 408a is located at a point between Optical spectrum analyzers 406 or between the transmitting terminal 400 and the first Optical spectrum analyzer 406a. Therefore, the dynamic gain equalizer 408a corrects the optical signal 403 at the first In-line amplifier 404a based upon the signal deviation present at the Optical spectrum analyzer 406a located at In-line amplifier 404b. This methodology is repeated for dynamic gain equalizers 408b, 408c and optical spectrum analyzers 406b and 406c. Thus, the optical signal 403 is modified at in-line amplifier 404c by the dynamic gain equalizer 408b based upon information transmitted to the dynamic gain equalizer 408b by the optical spectrum analyzer 408b based upon information transmitted to the dynamic gain equalizer 408b by the optical spectrum analyzer 406b located with in-line amplifier 404d. The dynamic gain equalizer 408c modifies the optical signal 403 at in-line amplifier 404e based upon data transmitted from the optical spectrum analyzer 408c located with in-line amplifier 404f. Therefore, the dynamic gain equalizer 408 correct the optical signal 403 at one subset of in-line amplifier 404 based upon the signal deviation analyzed at the optical spectrum analyzer 406 located at a second subset of in-line amplifiers 404.

In one embodiment, the dynamic gain equalizer 408 and the Optical spectrum analyzer 406 are spaced evenly throughout the optical network 401. The dynamic gain equalizer 408 are placed approximately in the center between two adjacent. Optical spectrum analyzers 406. The dynamic gain equalizer 408 closed to the transmitting terminal 400 is placed approximately in the center between the transmitting terminal 400 and the first Optical spectrum analyzer 406a. A wide variety of alignment schemes can be implemented without detracting from the spirit of the invention as long as at least one dynamic gain equalizer is not co-located with one Optical spectrum analyzer. In one embodiment, the control of the optical supervisory channel 412 is implemented through the use of a token which is transmitted to each device throughout the optical network 401. For example, when the Optical spectrum analyzer 406a has the token, that Optical spectrum analyzer 406a controls the gain tuning of the optical network 401 and can then transit amplification and gain differential information to the in-line amplifiers 404a and 404b and the dynamic gain equalizers 408a. Once this information has been transmitted and the in-line amplifiers 404a and 404b and the Dynamic gain equalizer 408a adjust the power appropriately, the Optical spectrum analyzer 406a sends the token downstream of the optical spectrum network 401, allowing another deice to transit the optical supervisory channel 412. The Optical spectrum analyzers 406a, in one embodiment, are in communication with the in-line amplifiers 404 and dynamic gain equalizers 408 which are located prior to the Optical spectrum analyzer 406. Thus, each Optical spectrum analyzer 406 maintains communication with the dynamic gain equalizer 408 and the in-line amplifiers 404 that are immediately preceding it and are not in communication with any other Optical spectrum analyzers 406. However, optional communication and control schemes are available and can be implemented without departing from the spirit of the invention.

Figure 5:
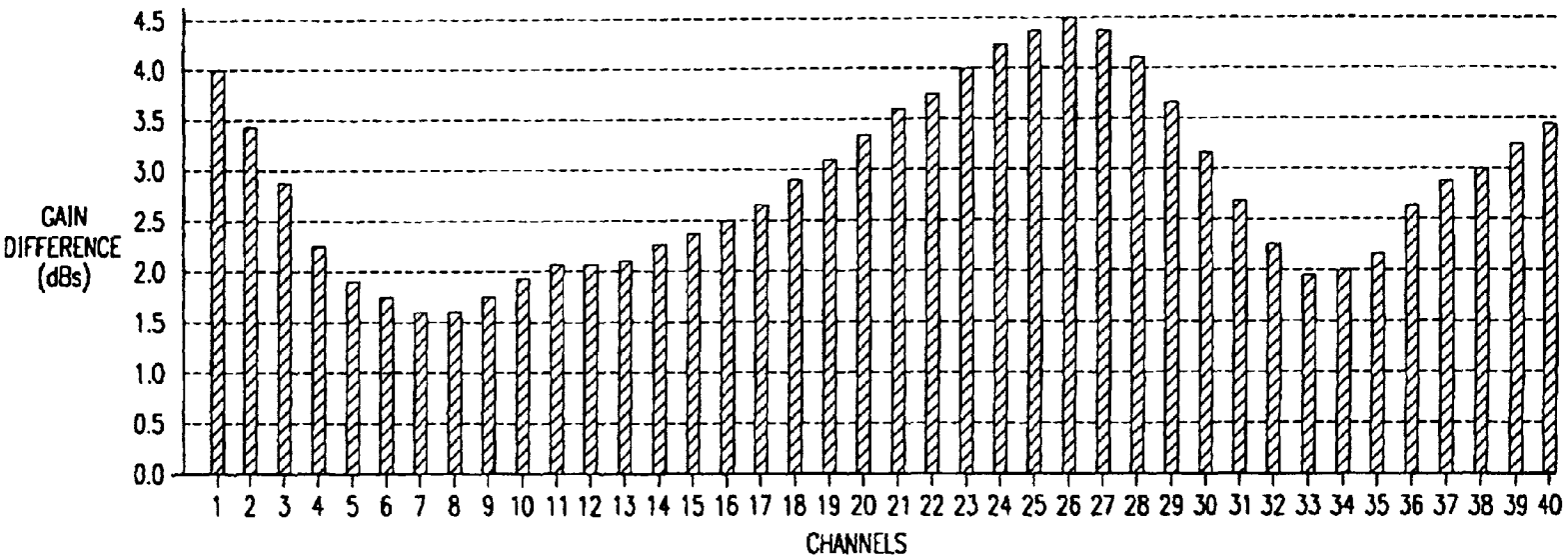
FIG. 5 is a graphical representation of the optical spectrum analysis of the gain per channel of an optical signal transmitted over the optical transmission system according to the present invention.

Referring now to FIGS. 4, 5, 6 and 7, the optical signal manipulation according to the present invention are shown. In FIG. 5, a graphical representation of a typical optical spectrum analysis conducted by the Optical spectrum analyzer 406 is shown. As expected, the gain difference varies from channel to channel and extends to approximately 1.5 dB's for channels 7 and 8 to 4.5 dB's for channel 26. Thus, depending upon the wavelength selected for each channel, the gain difference varies from channel to channel. The Optical spectrum analyzer 406 uses this information to determine the average gain difference of the optical signal from the pre-determined optical level and uses this information to adjust the power boost level of the In-line amplifiers 404 and then the Optical spectrum analyzer 406 determines on a channel-by-channel basis the amount of gain (or loss) necessary for each channel so that each channel's power equals the desired or optimal power level. This information is then transmitted from the Optical spectrum analyzer 406a to the Dynamic gain equalizer 408a through the optical supervising channel 412. The dynamic gain equalizer 408a the modifies the optical signal 403 at the In-line amplifier 404a on a channel-by-channel basis to compensate for the total amount of gain (or loss) that will be accumulated once the signal reaches the Optical spectrum analyzer 406a at the In-line amplifier 404b. The dynamic gain equalizer 408a adjusts the power associated with each channel of the optical signal 403 so the accumulated gain is zero once the optical signal 403 reaches the In-line amplifier 404b. To accomplish this task, the dynamic gain equalizer 408a must adjust the power associated with each channel of the optical signal 403 below the accumulated gain of zero. This can be seen in FIG. 6 which graphically represents the accumulated gain versus distance over an exemplary single channel of the optical signal 403 as it is transmitted over the optical network 401. For the exemplary channel of the optical signal 403, the accumulated gain caused by the loss differences propagated through the amplifiers 404 is shown as a linear gain over distance. The amount of gain for an exemplary channel of the optical signal 403 increases 2 dB's from the terminal to the first in-line amplifier 404a. The optical signal 403 on a channel-by-channel basis is then equalized by the dynamic gain equalizer 408a based upon the information received from the optical spectrum analyzer 406a. Therefore, in this example, the accumulated gain according to the spectrum analyzer 406a for this channel was a 4 dB accumulation. The dynamic gain equalizer 408a adjusts this channel with a 4 dB difference so the channel possesses the proper power level when the signal reaches the Optical spectrum analyzer 406a. When the dynamic gain equalizer 408a modifies this channel of the optical signal 403 at the in-line amplifier 404 location, the accumulated gain of this channel of the optical signal 403 is a negative 2 dBs. This equalization is demonstrated by line 608. As the optical signal 403a is transmitted from the in-line amplifier 404a to the in-line amplifier 404b, the accumulated gain continues to increase a constant amount until it reaches point x 602 which corresponds with the in-line amplifier 404b. As expected, the accumulated gain of this channel at the Optical spectrum analyzer 406a, which is co-located with the in-line amplifier 404b at a distance x 602, is zero. The dynamic gain equalizer 408a remembers, through the use of a memory mechanism located at the dynamic gain equalizer 408a, the amount of gain difference per channel that the dynamic gain equalizer 408c has received from the Optical spectrum analyzer 406a. The Optical spectrum analyzer 406a at distance x 602 again analyzes the optical signal 403 on a channel-by-channel basis to determine if the pre-equalized values do indeed correctly compensate the optical signal 403. If the accumulated gain of any channel is not zero, then the Optical spectrum analyzer 406a transmits this information via the optical supervisory channel 412 to the dynamic gain equalizer 408a to direct the dynamic gain equalizer 408a to adjust the amount of gain equalization to those specific non-zero channels.

It should be noted that during start-up procedures, the integrity of the optical signal 403 is not maintained until a series of adjustments are performed on the optical signal 430. Therefore, there will be a period of time upon the start-up of the transmission of the optical network 401 in which the data transmitted over the optical signal 403 will be invalid. However, once the integrity of the optical signal 403 is established, then the process described above continues to modify the amount of gain equalization necessary over time.

A benefit of the present invention occurs because the pre-emphasis of the gain equalization ensures that the average power over the n spans, where n equals the number of in-line amplifiers 404 for each channel of the dense wavelength division multiplexed system, is the expected or optimal power level. Further, the effects of random wavelength losses, as well as time varying polarization dependent losses are reduced by a factor of 2 by compared to the conventional approach. This improvement allows for twice as large component tolerances or with the same component parameters induces only half the penalty on the system margin. This improvement is demonstrated by the area formed by triangles outlined by lines 600, 608 and the distance ½x which define area 606. Area 606 plus area 604 (a negative value) are approximately zero. The system distortion from the fixed gain deviation has been nearly eliminated. Thus, when compared to area 202 of the prior art, a large benefit is realized. As the accumulated gain remain closer to zero (−2 dBs to 2 dBs) without straying as far as −4 dBs to 4 dBs in the conventional systems, the overall integrity of the optical signal 403 is increased.

FIG. 7 shows the gain difference power level in dB's of the channels of the optical signal 403 at the point of the optical spectral analyzer 406 in the optical network 401. Thus, the gain differential in dB's per channel of the optical signal 403 is constant is a constant zero. By having an average power deviation of zero, as is obtained in the embodiment disclosed in FIG. 4 through FIG. 7, the distortions of the optical signal pulse shape are greatly reduced.

The foregoing disclosure and description of the invention are illustrative and explanatory thereof of various changes to the size, shape, materials, components and order may be made without departing from the spirit of the invention.

What is claimed is:

1. A power equalization system for use in an optical transmission system, the system comprising:

an optical line, wherein the optical line includes at least one transmission channel;

a plurality of amplifiers coupled to the optical line, wherein the amplifiers are spaced [periodically throughout] *along* the optical line;

a plurality of [Optical] *optical* spectrum analyzers coupled to the optical line, wherein the [Optical] *optical* spectrum analyzers are spaced [periodically throughout] *along* the optical line and wherein the [Optical] *optical* spectrum analyzers generate analysis data; and a plurality of equalizers coupled to the optical line, wherein the equalizers are spaced [periodically throughout] *along* the optical line and wherein the equalizers equalize the power on the channels;

a management [line] *channel* for transmitting management data coupled to the pluralities of amplifiers, [Optical] *optical* spectrum analyzers and equalizers;

wherein the plurality of [Optical] *optical* spectrum analyzers are [collocated] *co-located* with a portion of the plurality of amplifiers and wherein the plurality of equalizers are [collocated] *co-located* with a second portion of the plurality of amplifiers and wherein at least one of the plurality of [Optical] *optical* spectrum analyzers is not [collocated] *co-located* with the plurality of equalizers; and

[whereby] *wherein* analysis data generated by the [Optical] *optical* spectrum analyzers is transmitted via the management channel to the equalizers for use by the equalizers in equalizing the power of the channels of the optical line.

2. The system of claim 1, wherein the amplifiers *are spaced periodically along the optical line and* include in-line amplifiers.

3. The system of claim 1, wherein the equalizers *are spaced periodically along the optical line and are configured to* equalize the power of each channel individually.

4. The system of claim 1, wherein the equalizers *are spaced periodically along the optical line and* include dynamic gain equalizers.

5. The system of claim 1, wherein the analysis data transmitted by the [Optical] *optical* spectrum analyzer is transmitted upstream.

6. The system of claim 1, wherein the plurality of amplifiers include:

a plurality of erbium-doped fiber amplifiers coupled to the optical line and the management [line] *channel*, wherein the erbium-doped fiber amplifiers adjust the power of the optical line to counteract gain tilt;

[whereby] *wherein* the erbium-doped fiber amplifiers counteract gain tilt through the adjustment of the power of all channels collectively at the amplifiers.

7. The system of claim 6, wherein the plurality of erbium-doped fiber amplifiers adjust the power of the optical line to counteract the gain tilt from Stimulated Raman Scattering.

8. The system of claim 6, wherein the plurality of erbium-doped fiber amplifiers adjust the power of the optical line to counteract the gain tilt from non-uniform fiber loss.

9. The system of claim 6, wherein the plurality of erbium-doped fiber amplifiers adjust the power of the optical line to [counter act] *counteract* the gain tilt based upon the analysis data transmitted via the management line.

10. The system of claim 1, wherein the plurality of equalizers *are spaced periodically along the optical line and are configured to* equalize the power on the channels so the average power over a periodic spacing is zero.

11. The system of claim 1, wherein the management [line] *channel* includes an optical supervisory channel.

12. The system of claim 11, wherein the optical supervisory channel includes one of the transmission channels of the optical line.

13. The system of claim 1, wherein the management channel includes a public telephone network.

14. The system of claim 1, wherein the management channel includes the Internet.

15. A method of gain equalization of an optical transmission system, the method comprising the steps of:

transmitting an optical signal over at least one optical channel of the optical transmission system;

transmitting a management signal over a management [line] *channel* of the optical transmission system;

amplifying the optical signal at [predetermined] *amplifying* positions in the optical transmission system;

analyzing the optical signal at a first portion of the [predetermined] amplifying positions;

determining an optical spectrum gain from the optical signal analysis;

transmitting an optical spectrum gain signal including the optical spectrum gain to an equalizer; and equalizing the optical signal based upon the received optical spectrum gain at a second portion of the [predetermined] amplifying positions;

wherein at least one position of the first portion of [predetermined] amplifying positions is not [collocated] *co-located* with a [predetermined amplifying] position of the second portion.

16. The method of claim 15, wherein *the* step of transmitting an optical signal over at least one optical channel includes transmitting optical signals over a plurality of optical channels.

17. The method of claim 16, wherein the steps of analyzing the optical signal and determining the optical spectrum gain includes analyzing each optical signal channel and determining the optical spectrum gain for each optical signal channel.

18. The method of claim 17, wherein the step of equalizing the optical signal includes equalizing each channel of the optical signal based upon the optical spectrum gain of each channel.

19. The method of claim 15, wherein the optical spectrum gain average over a predetermined span is zero.

20. The method of claim 15, wherein the equalizing of the optical signal includes dynamic gain equalization.

21. The method of claim 15, wherein the transmission of the optical spectrum gain signal is upstream.

22. The method of claim 15 further comprising:

determining an amount of gain tilt in the optical signal based upon the optical signal analysis;

transmitting a gain tilt signal including the amount of gain tilt of the optical signal to [an] *one or more* erbium-doped fiber amplifiers;

adjusting the power of the optical signal with the erbium-doped fiber amplifiers based upon the amount of gain tilt, wherein the erbium-doped fiber amplifiers counteract gain tilt through the adjustment of the power of all channels collectively at the amplifiers.

*23. An optical transmission system, comprising:*

*a plurality of optical transmission channels coupled at a first end to a first terminal and at a second end to a second terminal;*

*an optical spectrum analyzer coupled to the optical transmission channels at a first intermediate location between the first end and the second end;*

*an equalizer coupled to the optical transmission channels at a second intermediate location between the first end and the second end, wherein the equalizer is spaced apart from the optical spectrum analyzer;*

*wherein the system is configured to transmit analysis data generated by the optical spectrum analyzer to the equalizer for use by the equalizer in reducing power differences in the optical transmission channels.*

*24. An optical transmission system as recited in claim 23, further comprising a management channel, wherein said management channel is configured to carry said analysis data from the optical spectrum analyzer to the equalizer.*

*25. An optical transmission system as recited in claim 23, further comprising a first amplifier co-located with the optical spectrum analyzer and a second amplifier co-located with the equalizer, the first and second amplifiers being coupled to the optical transmission channels and configured to amplify optical signals in said channels.*

*26. An optical transmission system as recited in claim 23, further comprising a management channel, wherein said management channel is coupled to said first and second amplifiers such that commands from said optical spectrum analyzer are communicable via said management channel to said first and second amplifiers.*

*27. The optical transmission system of claim 23, further comprising an amplification location, wherein the first and second intermediate locations are not co-located with the amplification location.*

*28. The optical transmission system of claim 27, wherein the amplification location is between the first intermediate location and the second intermediate location.*

*29. A method for use in an optical transmission system, comprising:*

*amplifying an optical signal at one or more amplifying positions in the optical transmission system;*

*analyzing the optical signal at a first position and determining an optical spectrum gain;*

*transmitting an optical spectrum gain signal to an equalizer at a second position spaced apart from said first position; and*

*reducing spectral component power differences in the optical signal at said first second position based upon the received optical spectrum gain.*

*30. A method as recited in claim 29, wherein said spectrum gain signal is transmitted over a management channel to said equalizer.*

*31. A method as recited in claim 30, further comprising transmitting a command signal over the management channel to control one or more amplifiers.*

*32. A method as recited in claim 29, wherein said second position corresponds to one of said amplifying positions.*

*33. A method as recited in claim 32, wherein the optical signal is amplified at first and second amplifying positions, said first position corresponds to one of said amplifying positions, and said second position corresponds to a different one of said amplifying positions.*

*34. A system for use in an optical transmission system, comprising:*

*at least one amplifier configured to amplify an optical signal at one or more amplifying positions in the optical transmission system;*

*at least one equalizer;*

*an analyzer configured to analyze the optical signal at a first position, to determine a spectrum gain, and to transmit a spectrum gain signal to said equalizer;*

*wherein said equalizer is located at a second position spaced apart from said first position, and is configured to reduce channel-to-channel power differences in the optical signal at said first second position based upon the received spectrum gain.*

*35. A system as recited in claim 34, wherein said gain signal is transmittable over a channel to said equalizer.*

*36. A system as recited in claim 35, wherein said at least one amplifier is configured to be controlled via a command signal received over said channel.*

*37. A system as recited in claim 34, wherein said second position corresponds to one of said amplifying positions.*

*38. A system as recited in claim 37, wherein the optical signal is amplifiable at first and second amplifying positions, said first position corresponds to one of said amplifying positions, and said second position corresponds to a different one of said amplifying positions.*

*39. A system as recited in claim 34, comprising a plurality of equalizers spaced periodically along an optical line of said system.*

*40. A system as recited in claim 34, wherein said equalizer comprises a dynamic gain equalizer.*

*41. An optical transmission system, comprising:*

*an optical channel;*

*a management channel;*

*at least one amplifier stationed at an amplifying position along said optical channel;*

*at least one equalizer stationed at an equalizing position along said optical channel;*

*an amplifier stationed at an analyzing position along said optical channel and configured to generate a spectrum gain signal and to transmit said spectrum gain signal via said management channel to said at least one equalizer.*

*42. A system as recited in claim 41, further comprising at least one equalizer, wherein said equalizer is located at an equalizing position spaced apart from said analyzing position, and is configured to reduce channel-to-channel power difference in an optical signal at said equalizing position based upon the spectrum gain signal.*

*43. A system as recited in claim 42, wherein said equalizing position corresponds top said amplifying position.*

*44. A system as recited in claim 43, wherein said equalizer comprises a dynamic gain equalizer.*

*45. A method for use in an optical transmission system, comprising:*

*amplifying an optical signal at one or more amplifying positions in the optical transmission system;*

*analyzing the optical signal at a first position and determining an optical spectrum gain;*

*transmitting an optical spectrum gain signal via a management channel to a remote location.*

*46. A method as recited in claim 45, wherein said spectrum gain signal is transmitted over said management channel to an equalizer at a second position spaced apart from said first position.*

*47. A method as recited in claim 46, further comprising reducing spectral component power differences in the optical signal said second position based upon the optical spectrum gain.*

*48. A method as recited in claim 25, further comprising transmitting a command signal over the management channel to control one or more amplifiers.*

*49. A method as recited in claim 46, wherein said second position corresponds to one of said amplifying positions.*

*50. A method as recited in claim 46, wherein the optical signal is amplified at first and second amplifying positions, said first position corresponds to one of said amplifying positions, and said second position corresponds to a different one of said amplifying positions.*

* * * * *